(12) United States Patent
Urie et al.

(10) Patent No.: US 12,726,877 B2
(45) **Date of Patent: *Sep. 1, 2026**

(54) SUPPORT OF USER PLANE TRANSACTIONS OVER A MOBILE NETWORK

(71) Applicant: Nokia Technologies Oy, Espoo (FI)

(72) Inventors: Alistair Urie, Nozay (FR); Omar Elloumi, Nozay (FR); Laurent Thiebaut, Nozay (FR); Bruno Landais, Lannion (FR)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,418

(22) Filed: Feb. 14, 2024

(65) Prior Publication Data

US 2024/0306069 A1 Sep. 12, 2024

Related U.S. Application Data

(63) Continuation of application No. 14/360,993, filed as application No. PCT/EP2012/073517 on Nov. 26, 2012, now Pat. No. 11,910,292.

(30) Foreign Application Priority Data

Nov. 28, 2011 (EP) .................................... 11290544

(51) Int. Cl.

| | |
|---|---|
| ***H04W 40/02*** | (2009.01) |
| ***H04W 4/70*** | (2018.01) |
| ***H04W 76/12*** | (2018.01) |
| ***H04W 80/04*** | (2009.01) |
| ***H04W 88/16*** | (2009.01) |
| *H04W 76/22* | (2018.01) |

(52) U.S. Cl.
CPC ............ *H04W 40/02* (2013.01); *H04W 4/70* (2018.02); *H04W 76/12* (2018.02); *H04W 80/04* (2013.01); *H04W 88/16* (2013.01); *H04W 76/22* (2018.02)

(58) Field of Classification Search
None
See application file for complete search history.

(56) References Cited

U.S. PATENT DOCUMENTS

| | | | | |
|---|---|---|---|---|
| 11,910,292 B2 * | 2/2024 | Urie | ...................... | H04W 40/02 |
| 2012/0087274 A1 * | 4/2012 | Meriau | .................. | H04W 4/00 370/253 |
| 2012/0218965 A1 * | 8/2012 | Chen | .................... | H04W 72/20 370/328 |

* cited by examiner

*Primary Examiner* — Anh Ngoc M Nguyen
(74) *Attorney, Agent, or Firm* — Lippes Mathias LLP

(57) ABSTRACT

In an embodiment, there is provided an architecture for the support of user plane transactions over a mobile network between an User Equipment UE and an IP network, the mobile network comprising at least one node, referred to as control plane node, supporting control plane transactions between the UE and the mobile network over control plane bearer, the architecture includes the UE and the control plane node adapted to support user plane transactions over the mobile network between the UE and the control plane node, over control plane bearer, the control plane node adapted to support user plane transactions over the mobile network between the control plane node and the IP network without need of user plane bearer in the mobile network, the control plane node interfacing, with or without IP tunneling, with a gateway function interfacing with the IP network.

10 Claims, 7 Drawing Sheets

SUPPORT OF USER PLANE TRANSACTIONS OVER A MOBILE NETWORK

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

Examples of packet mobile communication systems include: Evolved Packet System EPS (specified in particular in 3GPP TS 23.401), GPRS/UMTS (specified in particular in 3GPP TS 23.060), CDMA EVDO, WiMAX, . . . etc.

Figure 1:
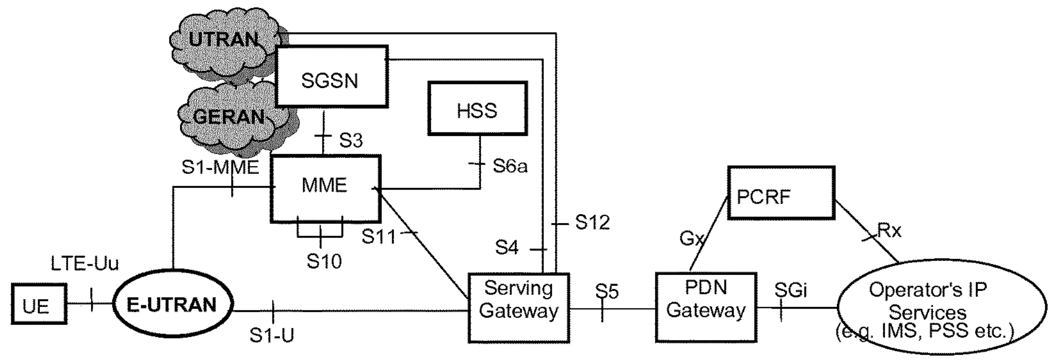

EPS, for example, comprises EPC (Evolved Packet Core) that can be accessed in particular by E-UTRAN or UTRAN, as recalled in FIG. 1 taken from 3GPP TS 23.401. EPS provides IP connectivity between an User Equipment UE and an external IP network (also called Packet Data Network PDN). Support of user plane transactions in EPS is based on the concepts of PDN connection and bearer, or allocated network resources for user plane transactions all over the network and over different interfaces of the network. Procedures are defined for managing (e.g. establishing or releasing) such PDN connection and bearers and associated contexts in different nodes of the network. There are similar concepts in systems other than EPS.

As recognized by the inventors and as will be explained later with more detail, there is a need for an improved support of user plane transactions over mobile networks, based on new concepts, for new types of communications such as for example Machine Type Communication MTC (also called Machine-to-Machine M2M) or other low bandwidth data communications. More generally, networks and systems improvements are needed due to the specific nature of new types of communications such as for example MTC or other low bandwidth data communications.

Embodiments of the present invention in particular address such needs.

These and other objects are achieved, in one aspect, by an architecture for the support of user plane transactions over a mobile network between an User Equipment UE and an IP network, said mobile network comprising at least one node, referred to as control plane node, supporting control plane transactions between said UE and said mobile network over control plane bearer. In an embodiment, said architecture comprises:

- said UE and said control plane node adapted to support user plane transactions over said mobile network between said UE and said control plane node, over control plane bearer,
- said control plane node adapted to support user plane transactions over said mobile network between said control plane node and said IP network without need of user plane bearer in said mobile network, said control plane node interfacing, with or without IP tunnelling, with a gateway function interfacing with said IP network.

These and other objects are achieved, in another aspect, by a method for access by an UE to user plane transactions services over a mobile network without need of user plane bearer in said mobile network, such as in particular in such architecture. In an embodiment, said method comprises at least one step, based on an indication to said control plane node, that no user plane bearer is needed for said UE for said services.

These and other objects are achieved, in another aspect, by a method for IP address allocation to an UE for user plane transactions services over a mobile network without need of user plane bearer in said mobile network, such as in particular in such architecture. In an embodiment, said method comprises said control plane node requesting IP address information for the UE via usage of address allocation server protocol (such as DHCP or any other protocol) to said gateway function.

These and other objects are achieved, in another aspect, by a method for support of user plane transactions over a mobile network without need of user plane bearer in said mobile network, such as in particular in such architecture. In an embodiment, said method comprises at least one step based on support of user plane transactions without need of user plane bearer.

These and other objects are achieved, in another aspect, by a method for inter-control plane node mobility over a mobile network without need of user plane bearer in said mobile network, such as in particular in such architecture. In an embodiment, said method comprises at least one step, based on de-activation and re-activation of a user plane service without need of user plane bearer during said inter-control plane node mobility.

These and other objects are achieved, in other aspects, by entities for such architecture and/or for performing such method(s), said entities including, in particular (but not exclusively): User Equipment UE, control plane node, and gateway function.

Figure 2:
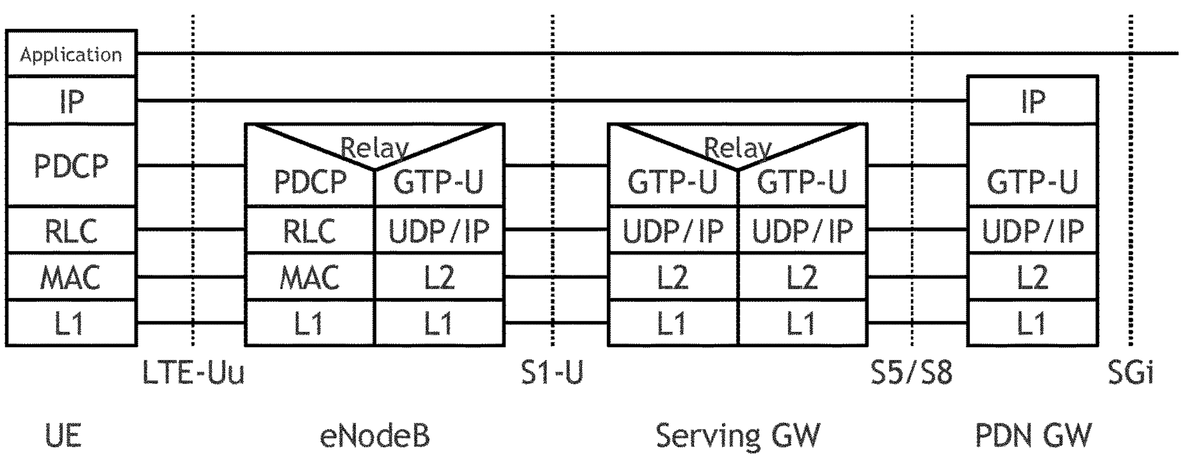
Figure 3:
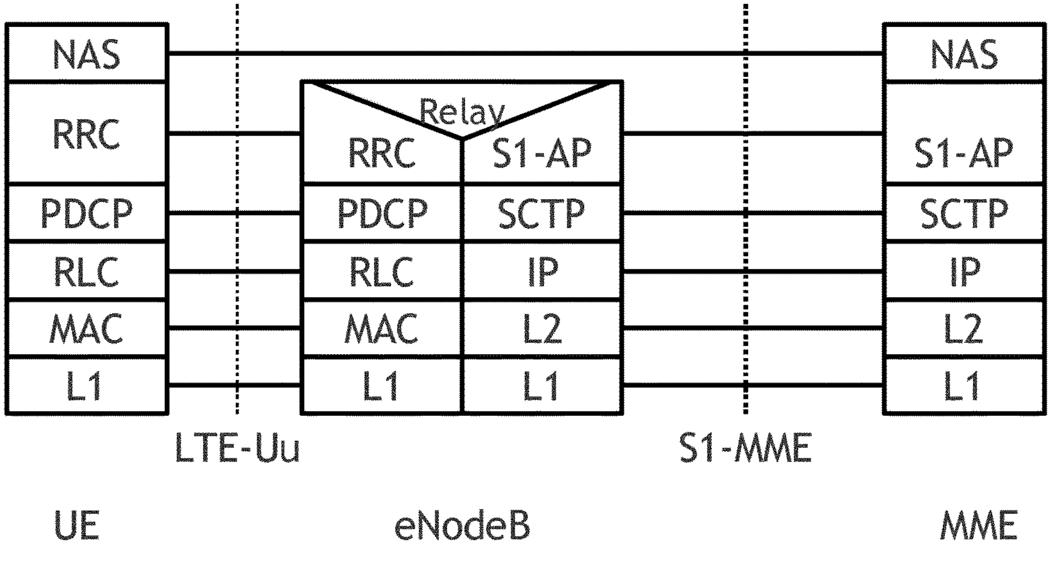
Figure 4:
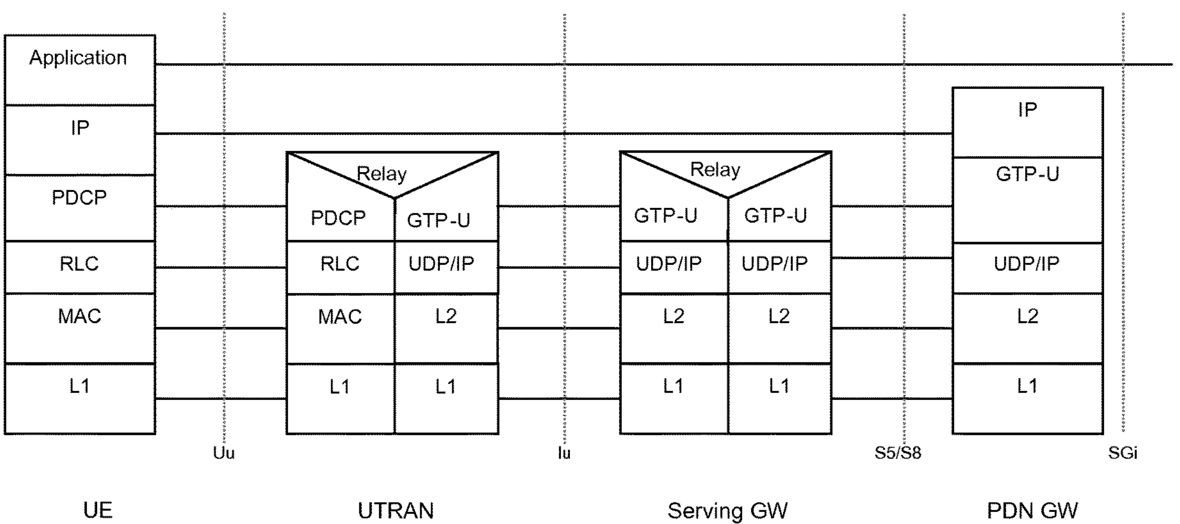
Figure 5:
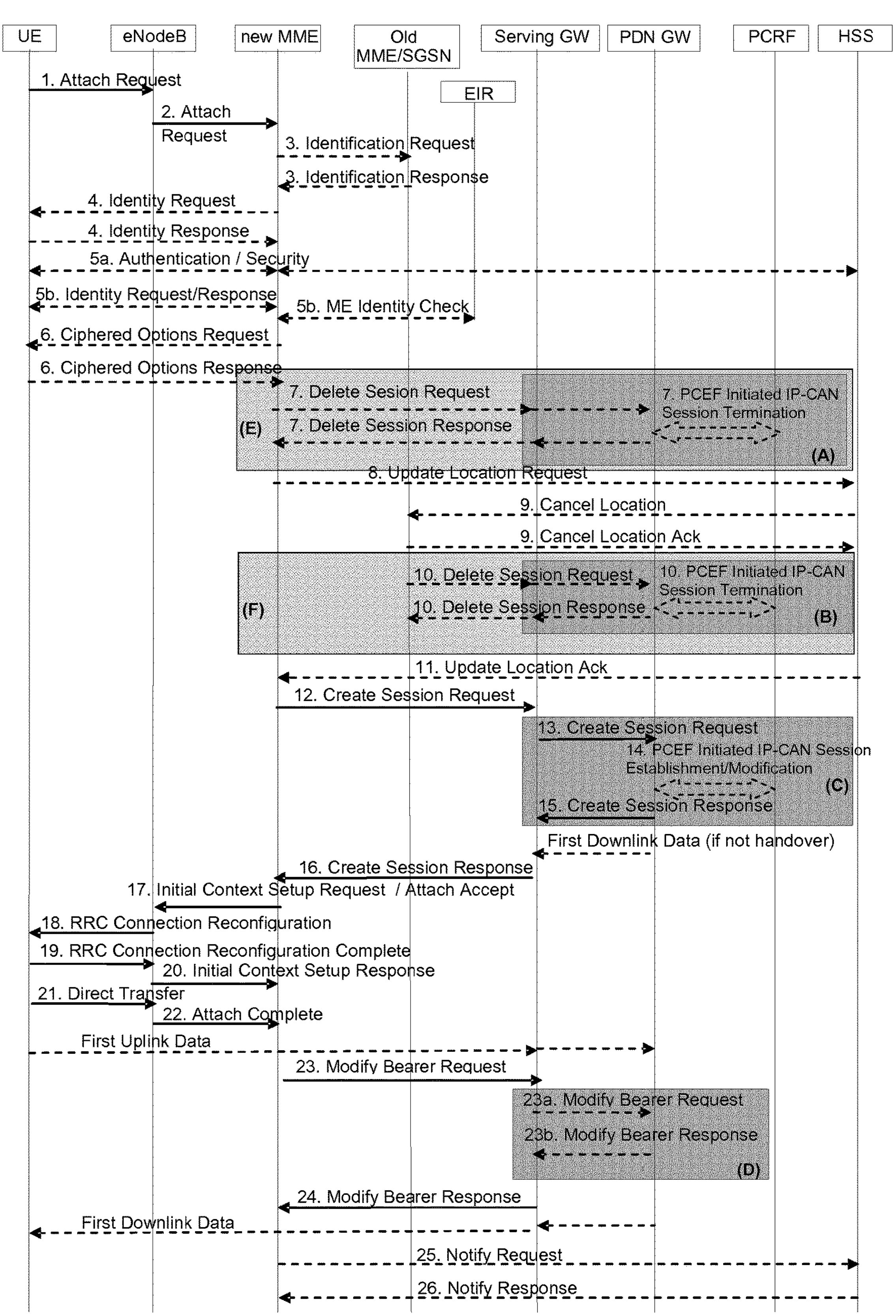
Figure 6:
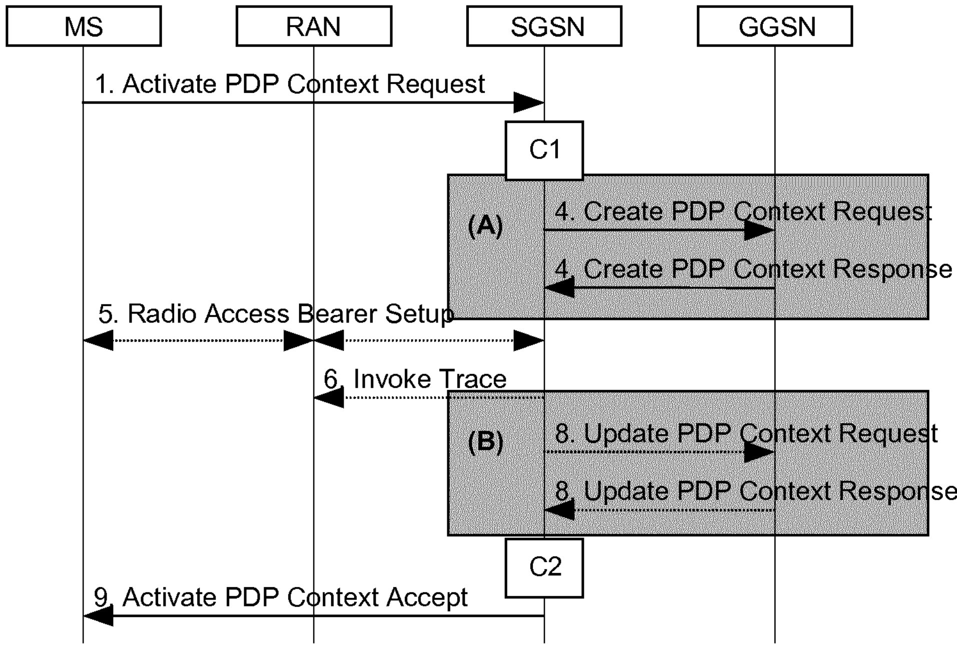
Figure 7:
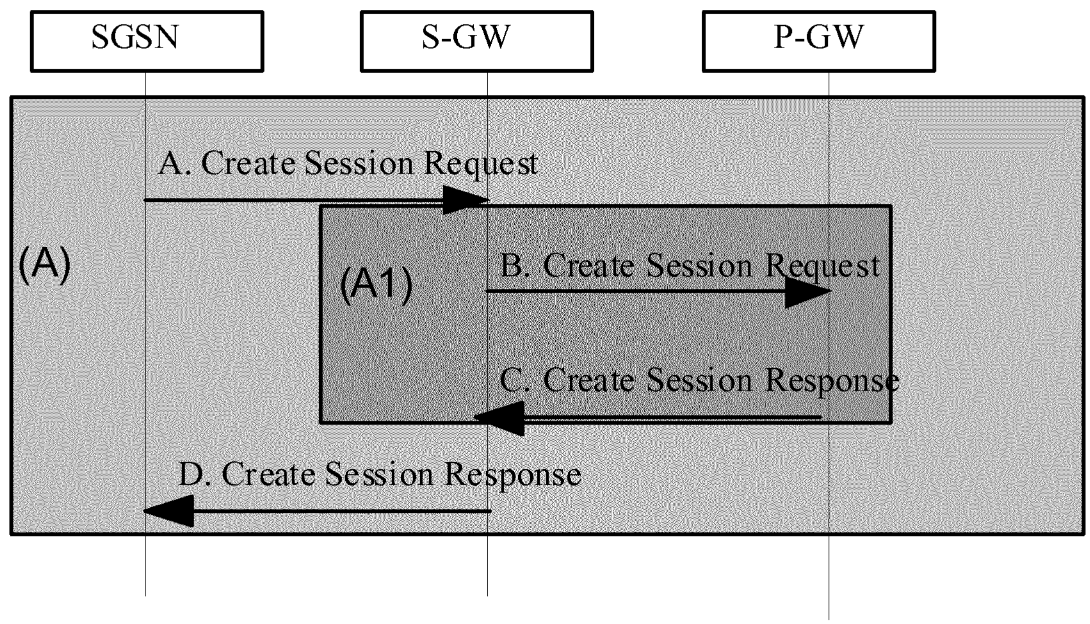
Figure 8:
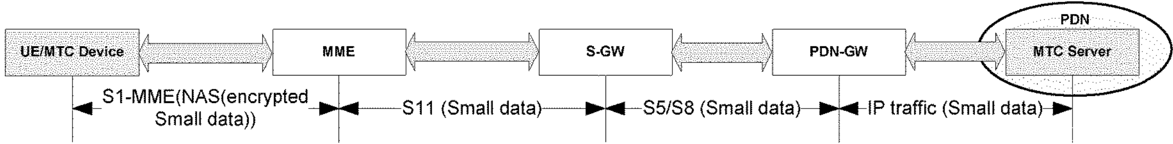
Figure 9:
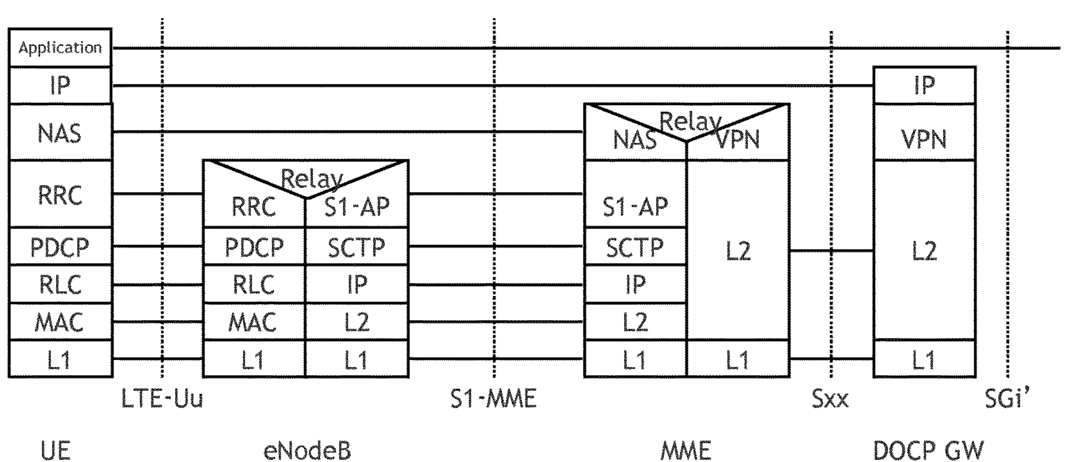
Figure 10:
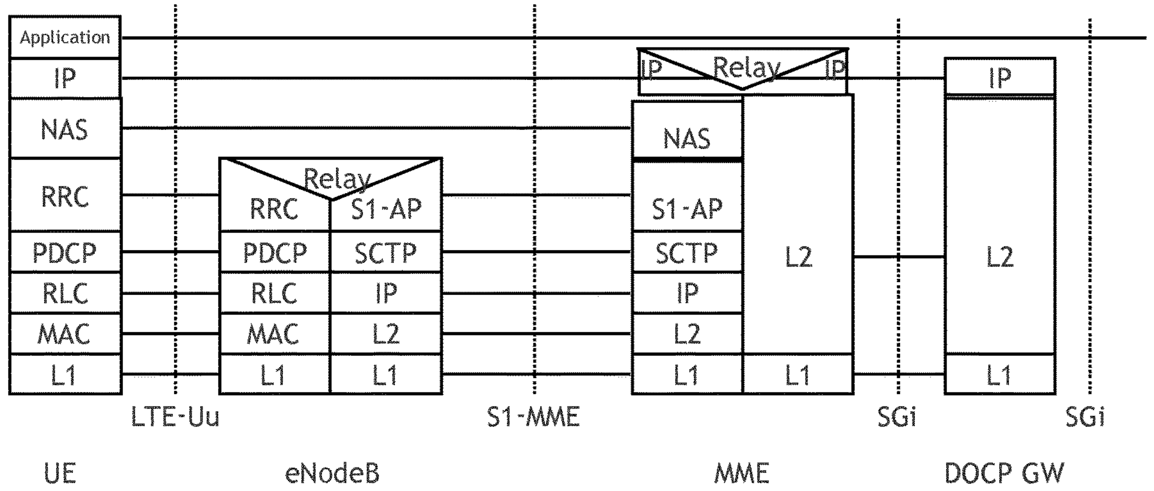
Figure 11:
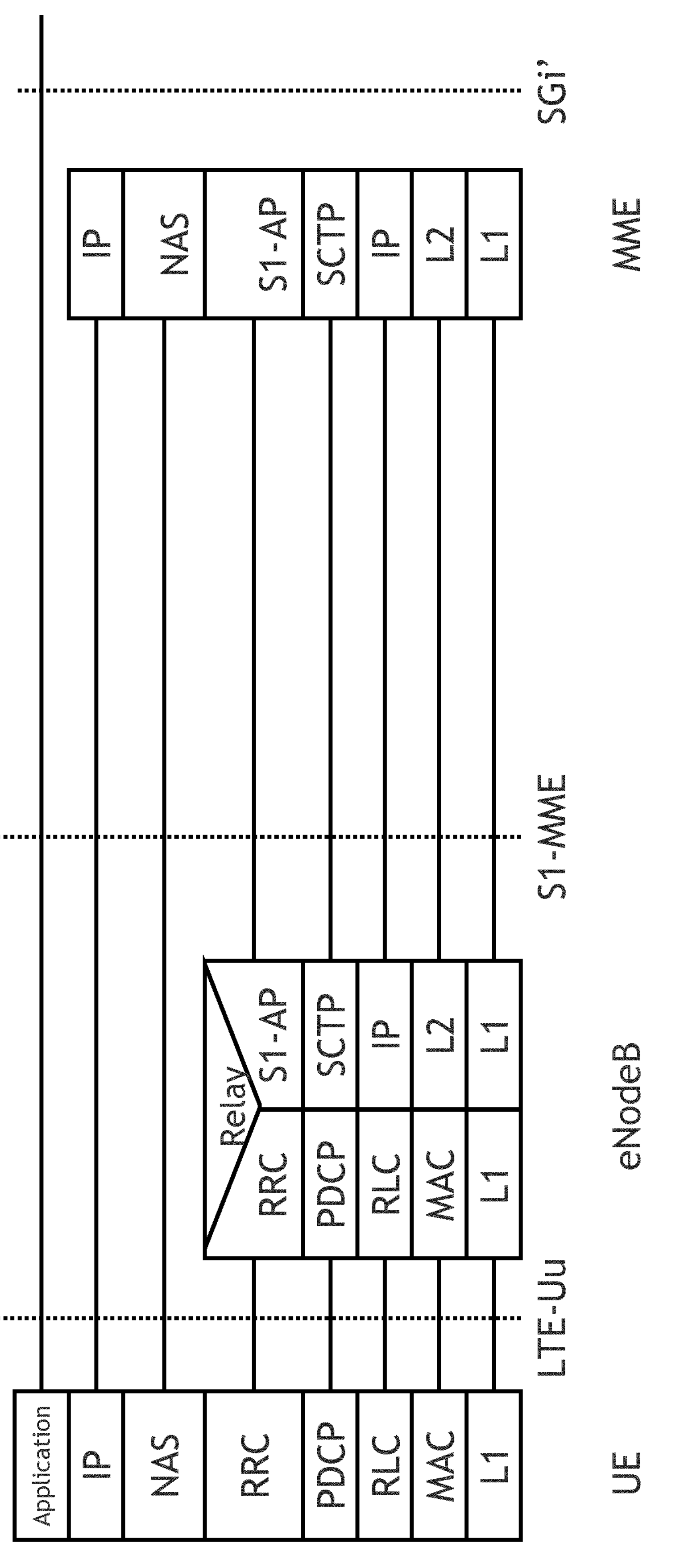

Some embodiments of apparatus and/or methods in accordance with embodiments of the present invention are now described, by way of example only, and with reference to the accompanying drawings, in which:

FIG. 1 is intended to recall an example of architecture for EPS,

FIG. 2 is intended to recall user plane protocol stack for E-UTRAN access to EPC, FIG. 3 is intended to recall control plane protocol stack for E-UTRAN access to EPC, FIG. 4 is intended to recall user plane protocol stack for UTRAN access to EPC, FIG. 5 is intended to recall signaling required to establish a PDN connection for E-UTRAN access to EPC, FIG. 6 is intended to recall signaling required to establish a PDP context for UTRAN access to GPRS Core, FIG. 7 is intended to recall signaling required to establish a PDP context for UTRAN access to EPC, FIG. 8 is intended to recall end-to-end data paths for small data transmission as currently proposed in 3GPP TR 23.888, FIG. 9 is intended to illustrate a first example of user plane protocol stack according to an embodiment of the present invention, by way of example for E-UTRAN access to EPC, FIG. 10 is intended to illustrate a second example of user plane protocol stack according to another embodiment of the present invention, by way of example for E-UTRAN access to EPC, FIG. 11 is intended to illustrate a third example of user plane protocol stack according to another embodiment of the present invention, by way of example for E-UTRAN access to EPC.

Embodiments of the present invention provide an efficient solution to carry infrequent transmission of short and sporadic user plane transactions between terminals and networks for Machine-to-machine (M2M) or more generally "Machine Type Communications" (MTC) mobile device or other low bandwidth data services.

Examples of target devices are a) sensor that reports once a day a few measures b) (coffee) Machine that once a week notify they need to be refilled.

All known existing solutions involve the use of the same packet core network procedures as for normal data services for normal users and so is not opportunised for low cost delivery of infrequent short transactions. Especially they involve either too much signalling when such devices wake up from time to time just to send a very small number of packets and/or require permanent allocation of resources in the EPC user plane (SGW and PGW).

For the case of LTE access:

1) the user plane is based on the protocol stack recalled in FIG. 2 (see 3GPP TS 23.401 FIG. 5.1.2.1-1).
2) with the corresponding UE-MME control plane protocol stack, recalled in FIG. 3 (see 3GPP TS 23.401 FIG. 5.1.1.3-1).

For the case of UMTS access:

3) the user plane is based on the protocol stack recalled in FIG. 4 (see 3GPP TS 23.401 FIG. 5.1.2.4-1) in the Evolved Packet Core: (represented in the best case, i.e. with direct tunnel between UTRAN and SGW)
4) Similar drawings exist for user plane in GPRS Core. See 3GPP TS 23.060.

In all these cases, extensive signaling is required throughout the network to establish a PDN connection from the UE up to the PDN GW (in the Evolved Packet Core) or to the GGSN (in GPRS Core), as shown in FIGS. 5, 6, 7 respectively for E-UTRAN or UTRAN (see 3GPP TS 23.401 FIG. 5.3.2.1-1 and 3GPP TS 23.060 FIGS. 64 and 64a respectively).

Also, in all of these cases the packet core (SGW/PGW) needs to have a permanent connection established to route incoming packets addressed to the UE from PGW to SGW (and onwards to SGSN for WCDMA and GSM access). In the case of infrequent small data transmission services this is a wasted network resource.

The current packet network procedures are thus inefficient for infrequent small data transmissions as creating a lot of signalling (and processing) overhead with respect to the actual amount of data to be sent.

This has been identified as a key issue within the study of 3GPP SA2 on System Improvements for Machine Type Communications. See 3GPP TR 23.888 clause 5.4.

One solution is proposed in TR 23.888 clause 6.53 ("*Solution—Small Data Transfer* (*E-UTRAN*): *Use of pre-established NAS security context to transfer the IP packet as NAS signalling without establishing RRC security*") that optimizes the signalling between the UE and MME by allowing the transfer of the small data within the NAS (Non Access Stratum signalling), thus avoiding the need to establish S1 and radio bearers at every occurrence of small data when the UE is in idle mode. This solution is illustrated in FIG. 8.

However this solution still requires to establish a PDN connection throughout the network. It is thus not adapted to infrequent small data transmission (which is a more likely scenario than frequent small data transmission).

SMS is also not a suitable approach for the transfer of short user plane packets because:

- this would not allow IP based communications;
- the SMS payload (160 octets) is too small: as per 3GPP SA1 requirement, it should be possible to transfer up to 1 K octets of small data;
- concatenating multiple SMSs would be fairly inefficient; SMS infrastructure and processing overhead;
- SMS is not supported for PS only devices under LTE.

M2M or MTC devices often involve infrequent transactions with short packet lengths (e.g. gas metering reporting once every month).

Issues

- LTE/EPC networks require establishment allocation of default bearer permanently locking up resources on PGW and SGW which is only infrequently used
- Each time an MTC device needs to initiate a transaction it must first launch a series of control plane transactions to re-establish the user plane connection through to the SGW. In many cases more radio interface and networking traffic is wasted in these control plane messages than the actual user plane message There is a need to determine a new mechanism for MTC service data transmission that avoids need for normal EPC user plane Embodiments of the present invention in particular enable to solve such problems or avoid such drawbacks.

Hereinafter, embodiments of the present invention will more particularly be described, by way of example and for illustration purpose, for the case of M2M or MTC communications over EPS. However, the present invention is not limited to such case.

Embodiments of the present invention build on from the solution proposed in TR 23.888 clause 6.53 and define a mobile "Data over Control Plane" option (for sporadic and small data transactions) and have the control plane node (e.g. MME for LTE access or SGSN for legacy 3gpp radio) route this traffic via a new "Data over Control Plane Gateway" function (that can be implemented by an existing network node, e.g. Broadband Network Gateway BNG), and thus without the need to establish a PDN connection to a PGW/GGSN).

The short user plane IP transactions are transported over the control plane signaling channel between the UE and the control plane node in the network, according to principles similar to the solution defined in clause 6.53 of 3GPP TR 23.888), to avoid the need to establish dedicated user plane bearer over the radio and over the interface between the RAN (Radio Access Network) and the Core. The IP traffic is carried over signaling links between the UE and the Core network Node.

Various embodiments of the present invention for providing a "Data over Control Plane" (DOCP) service will be described hereinafter.

FIGS. 9, 10, 11 illustrate examples of protocol stack for DOCP service, for example for E-UTRAN access to EPC. In the examples illustrated in FIGS. 9 and 10, control plane node MME interfaces with the external IP network via a gateway function noted DOC GW.

In the example illustrated in FIG. 9, the control plane node MME interfaces, with IP tunnelling, with a gateway function DOCP GW interfacing with an IP network. In the example illustrated in FIG. 10, the control plane node MME interfaces, without IP tunnelling, with a gateway function DOCP GW interfacing with an IP network. FIG. 9 may in particular be used when the control plane node and the gateway function are located in different PLMNs, e.g. when the subscriber is roaming, whereas FIG. 10 may in particular be used when the control plane node and the gateway function are located in the same PLMN, e.g. when the subscriber is not roaming.

FIG. 9, where the control plane node MME interfaces, with IP tunnelling, with the gateway function DOCP GW, will first be considered.

In the example of FIG. 9, IP tunneling is illustrated by a "VPN" layer, which may be any suitable IP tunnel protocol (L2-TP, L2-VPN, L3-VPN, GRE, etc.).

For the case of 3GPP access, the "Data over Control Plane" (DOCP) service is provided as an alternative (to regular PDN connection/PDP context) access mechanism to be used by particular mobile terminals (UE) for all or only certain data sessions that infrequently send a limited number of IP packets.

Over LTE, during the attachment phase, a UE configured to use DOCP includes an indication in the attachment message that no default bearer needs to be established but rather the alternative DOCP procedure should be used (this indication may e.g. take the form of a modified PDN CONNECTIVITY REQUEST message where a DOCP PDN connection indicator is provided), alternatively a special APN could be defined that the UE and/or HSS record uses to indicate to the MME that the default bearer and PDN connection establishment should process using the alternative DOCP procedure.

In a system (such as EPS supporting S1-Flex) wherein a RAN node (such as E-UTRAN node) can be connected to more than one control plane node (such as. MME or SGSN), the UE may include an indication to the serving RAN node requesting the RAN node to select a control plane node supporting DOCP services. Since the UE may start using DOCP services after it has attached, this steering of UE towards DOCP capable control plane node might rely on an indication during UE attachment that the UE supports and may use DOCP services later on.

After verifying that the particular MTC device subscription has previously been granted permission to use the DOCP service, the MME then answers with an acknowledgement that includes (e.g. IPv6) addressing to be used by the UE when using the DOCP service as in the case of a regular PDN connection (this acknowledgement may e.g. take the form of a modified ACTIVATE DEFAULT EPS BEARER CONTEXT REQUEST message). If the selected MME or SGSN does not support the DOCP service then it may use Multi-Operator Core Network (MOCN) procedures to redirect the attachment request to an alternative control plane node that does support DOCP service.

Over 2G/3G (GSM, WB-CDMA) 3gpp Radio, a UE configured to use DOCP includes an indication in the ACTIVATE PDP CONTEXT REQUEST message that no bearer needs to be created but rather the alternative DOCP procedure should be used. After verifying that the particular MTC device subscription has previously been granted permission to use the DOCP service, the SGSN then answers with an acknowledgement that may include (e.g. IPv6) addressing to be used by the UE when using the DOCP service as in the case of a regular PDP context.

Note 1: This solution introduces the possibility for a UE to attach via E-UTRAN without setting a default bearer to the PGW, like supported under GERAN/UTRAN in GPRS Core. This could be formally handled as either a modification of the rule that all UEs shall have a default bearer established or that the DOCP procedure is to be used as the de facto default bearer.

Note 2: The control plane node (e.g. MME for LTE access or SGSN for GERAN/UTRAN) may decide whether to use this small packet (DOCP) solution or establish a regular PDN connection to the PGW/GGSN based on the DOCP indication received in NAS signalling from the UE, the APN to which the UE requests to send data, subscription parameters received from the HSS (e.g. APN configuration parameters identifying whether this APN is associated with infrequent small data transmissions), local operator policy and/or possible knowledge of past traffic exchanges (e.g. detection that the UE's traffic exceeds some upper threshold for the DOCP service).

Note 3: A UE using the DOCP procedure may use existing procedures to open a second PDN connection via normal PGW. This dual PDN approach could be used at the application layer to support high traffic periods or specific applications on the UE (e.g. SW download of the UE) and may be triggered using application layer signalling over the DOCP connection (i.e. for bulk update or download processes involving a UE that normally only needs to support infrequent small data transmission services).

Note 4: An MME or SGSN may use existing procedures to force a DOCP connected UE to re-attach using normal PDN procedures and/or to force DOCP capable UEs connected using normal procedures to reattach using DOCP procedures. This alternative PDN approach could be used by the network to balance UE connections between DOCP and normal mechanisms.

Note 5: Specialised MME or SGSN may be deployed that support the DOCP service while "normal" MME or SGSN remain in place to service UE that do not require DOCP service. Selection of a DOCP capable control plane node may for example be performed as indicated above.

No dedicated bearer channel is established to carry the User plane (IP packets) traffic for this DOCP service over the radio interface and over the interface between the RAN (Radio Access Network that may be e.g. an UTRAN or an E-UTRAN defined by 3gpp) and the Core Network (e.g. over S1-u and Iu).

In the uplink direction (terminal to network), user plane traffic carried over the DOCP bearer corresponds to normal IP packets encapsulated within a dedicated NAS messages and transparently carried from UE to MME (or SGSN) over the radio interface LTE-Uu (or UTRAN-Uu) and the control plane interface S1-MME from eNB to MME (or Iu-PS from UTRAN to SGSN).

Note: This is similar to the principles of the solution proposed in clause 6.53 of 3GPP TR 23.888 that may be used to transport the short user plane IP packets over the control plane signaling channel between the UE and control plane node.

Within the MME (or SGSN) the specific NAS message type, for example "DOCP transparent transfer", is used to separate DOCP user plane traffic from other NAS messages that are normally terminated in the MME (or SGSN) itself. This traffic separation may be used to provide different QoS to normal signaling and to the DOCP traffic (e.g. In case of transport or node congestion).

After verifying that the particular terminal has previously been granted permission to use the DOCP bearer, the MME (or SGSN) routes the IP packet over the interface towards a DOCP Gateway responsible for sending this traffic towards native IP networks.

Note: The term "DOCP Gateway" (or "DOCP GW") refers throughout this document to the "Data over Control Plane Gateway" function that may be implemented by an existing network node (see possible embodiment further down).

If the UE was in idle mode (when needing to send Uplink traffic) then the UE first initiates UE triggered Service Request (e.g. as described in 3GPP TS 23.401 section 5.3.4.1 for LTE). However the UE triggered Service Request procedure is modified as follows:

The Service Request contains an indicator that no User plane bearers need to be established. Thus MME/SGSN does not initiate the (re)establishment of an S1-U connection;

The UE sends the first User plane packet that it wants to send Uplink via the DOCP procedure encapsulated in a NAS (e.g. "DOCP transparent transfer") message itself piggy-backed over radio in the RRC message (e.g. Radio bearer set-up complete for LTE) that acknowledges the transition into secured mode;

Subsequent up and down link packets are then carried as (e.g. "DOCP transparent transfer") NAS messages over the active signalling bearer.

For the downlink (network to terminal) user plane traffic, the DOCP Gateway routes IP packets based on the destination address towards the serving MME (or SGSN)—the destination address may pertain to a block of addresses assigned by the DOCP GW to the serving MME/SGSN (see IP address allocation mechanisms further down). This MME (or SGSN) then uses the destination IP address to determine the target UE and encapsulates the downlink IP packet into a (e.g. "DOCP transparent transfer") NAS message towards the RAN and the RAN (ENB or UTRAN) uses established NAS transport procedures to deliver the message to the UE over the radio.

Note 1: A lower priority than the priority allocated to regular NAS signaling may be used over radio when transferring this (e.g. "DOCP transparent transfer") NAS message dedicated to actual transfer of user plane. This lower priority is signaled by the MME/SGSN when it sends to RAN the S1/Iu message requesting from the RAN a NAS TRANSPORT to the UE (i.e. S1-AP DOWNLINK NAS TRANSPORT and Iu DIRECT TRANSFER messages).

Note 2: DOCP messages are delivered over the NAS bearer which relies on S1-AP (for LTE) or Iu (for UTRAN), SCTP and the radio interface functionality in RRC, PDCP and RLC to ensure the delivery of the packet to the UE.

Upon reception, the UE de-encapsulates the message and delivers the IP packet to the application layer using established IP end stack procedures.

If the UE was in idle mode then the MME/SGSN should first initiate Network Triggered Service Request and hence page the UE (e.g. as described in 3GPP TS 23.401 section 5.3.4.3 for LTE).

At any time the UE may use multiple-PDN/Multi PDP context procedures (e.g. as described in 3GPP TS 23.401 section 5.10 for LTE) to establish an additional PDN/PDP context with default and optionally one or more dedicated bearers. In this case the UE would have one PDN access/PDP context using DOCP procedures and one or more additional PDN accesses/PDP contexts using normal 3GPP procedures via a PDN GW/GGSN. The UE should indicate when normal PDN is to be used during the UE Triggered Service Request message.

At any time the UE or MME/SGSN may use established explicit Detach procedures (e.g. as described in 3GPP TS 23.401 section 5.3.8 for LTE) followed by Attach procedures, or if the UE uses multiple PDN connections, use established PDN disconnection procedures (e.g. as described in 3GPP TS 23.401 section 5.3.10 for LTE) followed by UE requested PDN connectivity procedures (e.g. as described in 3GPP TS 23.401 clause 5.10.2) to transition between use of normal PDN procedures and DOCP procedures for the same PDN access. When initiated by the network, the Detach message should include the "Re-attach required" indication in the detach type information element, and the Deactivate EPS Bearer Context Request (LTE) or Deactivate PDP Context Request (UTRAN) message should include the "reactivation requested" cause value, as well as an indication of the procedure (DOCP or normal PDN connection) the network requests the UE to follow.

The MME/SGSN has a dedicated interface with the DOCP GW referred to here as Sxx. Sxx is made up of IP forwarding with VPN tunneling (as the MME/SGSN and the DOCP GW are likely to be in different PLMN(s)).

A DHCP interface allowing the MME/SGSN to get/release an IPv4 address/IPv6 Prefix for the device the management of the IP addressing capability of the device by the HPLMN: e.g. Radius/Diameter accounting generation, Dynamic DNS update, etc. . . . .

The MME/SGSN functions are augmented with the following functions:

VPN tunnel establishment towards the DOCP GW;

Relay function to forward IP packets between NAS signaling and the VPN tunnel to the DOCP GW;

DHCP function towards the DOCP GW to manage the UE services (e.g. IP address allocation, charging, interception);

Prioritisation of regular NAS signaling over NAS signaling used for DOCP messages.

Note: The MME/SGSN already supports legal intercept of signalling. This may be re-used for interception of the DOCP messages encapsulated in NAS signalling.

The DOCP GW is responsible of the UE's IP address allocation, Legal Intercept, charging, Firewalling, NATing of the user plane traffic.

Note: The DOCP GW may also be responsible of making the IP address allocated to the UE known to the peer of the UE (e.g. MTC server in case of usage of the DOCP feature for Machine-machine communications). This may be supported by the DOCP GW updating the DNS record associated with the UE or by any other means such as using Radius Accounting to notify which IP address has been allocated to which UE.

At the activation of a PDN connection/PDP context using DOCP procedures, the MME/SGSN selects one or more suitable DOCP GW (using an extension of the DNS Procedures defined in 3GPP TS 29.303).

sends a DHCP request on behalf of the UE. This DHCP request contains the IMSI of the UE and the target APN This DHCP request is sent in an IP tunnel towards the selected DOCP GW The DOCP GW may e.g. apply the following address allocation scheme when allocating IP address to UEs:

the DOCP GW allocates the UE's IPv6 64-bit network prefix (or IPv4 address) and associates this UE's IPv6 64-bit network prefix (or IPv4 address) with the tunnel towards the MME/SGSN.

For example the UE is allocated a sub-prefix of the serving MME/SGSN globally unique IPv6 prefix;

(consequently DOCP GW will route the downlink user plane packets towards the serving MME/SGSN)

Once it has allocated an IP address or Prefix to an UE, the DOCP GW may notify the application environment that the UE is now reachable for IP services. This may include to generate AAA signaling to a AAA server (e.g. Radius Accounting a PGW/GGSN generates at PDN connection activation as described in 3gpp 29.061 or as a BNG generates when it has activated an IP session)

issue dynamic DNS updates on behalf of the UE etc. . . . .

Likewise, when it receives a DHCP request to release the IP address/Prefix for an UE, the DOCP GW notifies the application environment that the UE is no more reachable for IP services. This may include to generate AAA signaling to a AAA server (e.g. Radius Accounting a PGW/GGSN generates at PDN connection de-activation as described in 3gpp 29.061 or as a BNG generates when it has de-activated an IP session)

issue dynamic DNS updates on behalf of the UE etc. . . . .

The DHCP signaling between the MME/SGSN and the DOCP GW contains a restart counter allowing each node to detect that the other node has restarted and that thus the resources associated with the other node have to be released The MME/SGSN stores the mapping between the UE's IMSI or TMSI and the IP address allocated to the UE.

Note 1: For IPv6 stateless address autoconfiguration, the UE can choose any interface identifier to generate IPv6 addresses, other than link-local, without involving the network, and for privacy, the UE may change the interface identifier used to generate full IPv6 address without involving the network. See 3GPP TS 23.401 clause 5.3.1.2.2. Consequently IPv6 address allocation schemes in the DOCP GW should aim at allocating a globally unique IPv6 prefix to each UE to avoid impacting UEs and changing the existing IPv6 stateless address autoconfiguration principles.

Note 2: In case of IPv4 addressing (private IPv4 address allocated to the MTC UE), it may be necessary to associate an APN with a tunnel allowing the MTC UE (with private IP address) to reach a MTC server over Internet without usage of NAT (see 3GPP TR 23.888 subclause 6.29.2). This works fine when the First hop router of the MTC device is in a HPLMN (the Service Level Agreement between the MTC server and the HPLMN defines such tunnel), but asking the DOCP GW (or any box) in a VPLMN to support such tunnelling would be complex in terms of Operations.

Possible solutions:

use IPv6 only; or allocation of the DOCP GW in the HPLMN (i.e. the serving MME/SGSN selects the DOCP GW in HPLMN with DNS procedures similar as for PGW selection);

rely on alternative NAT solutions (e.g. NAT controlled) not requiring the setup of a tunnel from the DOCP GW to the MTC Server.

When the UE moves and requires changing serving MME/SGSN then the UE should get a new IPv4 address or IPv6 prefix from the new MME/SGSN. During inter-node (inter-SGSNs/MMEs) mobility, the bearer context associated to the DOCP PDN connection is deactivated. E.g. for LTE, if a TRACKING AREA UPDATE REQUEST is received from a UE with a DOCP PDN connection, then the MME locally deactivates the DOCP bearer context associated with the DOCP PDN connection. If active bearer contexts remain for the UE and the TRACKING AREA UPDATE REQUEST request message is accepted, the MME informs the UE via the EPS bearer context status IE in the TRACKING AREA UPDATE ACCEPT message that the DOCP bearer context was locally deactivated. The UE may re-establish the DOCP PDN connection by initiating a UE requested PDN connectivity procedure.

Note 1: The deployment of MME/SGSN pools (i.e. using Intra-domain connection of Radio Access Network (RAN) nodes to multiple Core Network (CN) nodes, see 3GPP TS 23.236) greatly reduces inter-MME or inter-SGSN mobility. The deployment of combo MME/SGSN also greatly reduces mobility between MME and SGSN. Consequently the need to re-new the UE's IP address upon inter-CN node mobility is not seen as an issue, especially for infrequent small data transmission. Applicative retransmission mechanisms would also be used typically if some packets were lost due to UE's mobility between different CN nodes.

Embodiments of the present invention add new transport mechanism optimised for short packet transactions using new "UnitData" message over control plane bearer and have the primary network control plane node (MME for LTE access, SGSN for GSM/WCDMA, HSGW for CDMA/DO) provide IP relay function towards a new "Data over Control Plane Gateway" node Embodiments of the present invention provide following specific features:

Data flow transparently carried over control plane bearer (NAS for LTE access)

New message type to be defined indicating data over control plane message

New (lower) Signalling priority over RAN (for DOCP user plane)

IP address allocated to device using a common prefix shared with all connected "data over control" devices and a unique suffix used to identify the specific device Control plane node has relay function mapping UL: an UE to a tunnel towards the DOCP GW serving that user DL: from IP header onto specific device's control plane bearer In embodiments of the present invention, MME presents IP flow per UE to DOCPGW working with IP flows only and routes all traffic to UEs connected to a specific MME to that MME using the fact the all of these UEs have IP addresses within a sub-domain controlled by the MME.

In embodiments of the present invention, DOCPGW functionality is minimised and is "IP only" (no GTP, no mobility or other 3GPP functionality). Could have a role in per UE handling if second AAA stage is added during attachment (i.e. during IP address assignment) and so DOCPGW very similar to wireline BNG.

FIG. 10 illustrates an example where the control plane node MME interfaces, without IP tunnelling, with the gateway function DOCP GW.

FIG. 10 will not be described in more detail, because principles already explained for FIG. 9 still apply to FIG. 10, taking into account that IP forwarding over the interface between MME and DOCP GW is performed without IP tunneling in FIG. 10, whereas it is performed with IP tunneling in FIG. 9. In FIG. 10, the interface between MME and DOCP GW has, like the interface between DOCP GW and external IP network, functionalities of SGi interface between mobile network and external IP network.

FIG. 11 illustrates another example of protocol stack for DOCP service, for example for E-UTRAN access to EPC. In this example, control plane node MME interfaces directly with the external IP network.

In the example illustrated in FIG. 11, MME handles all IP functionality and directly offers SGi interface. In this example, MME performs all LI, charging and rating functions.

Alternatives to various above-described embodiments include:

1. SGSN performs a similar role to MME when using GSM and WCDMA access;
2. HSGW performs a similar role to MME when using CDMA EVDO access;
3. ASNGW performs a similar role to MME when using WiMAX access;
4. Procedure to transition between DOCP and normal PDN access modes using a new EMM state when "EMM-REGISTERED" would correspond to normal PDN access and a new "EMM-REGISTERED_USING_DOCP" would correspond to DOCP based PDN access.
5. Use of procedures to select particular control plane nodes modified to support DOCP service.

Alternatives to various above-described embodiments include:

a) DOCP GW is implemented with MME as an integrated node
b) DOCP GW is implemented with PDN GW as an integrated node In one aspect, there is provided an architecture for the support of user plane transactions over a mobile network between an User Equipment UE and an IP network, said mobile network comprising at least one node, referred to as control plane node, supporting control plane transactions between said UE and said mobile network over control plane bearer.

Various embodiments are provided, which may be taken alone or in combination, according to various combinations.

In an embodiment, said architecture comprises:

said UE and said control plane node adapted to support user plane transactions over said mobile network between said UE and said control plane node, over control plane bearer, said control plane node adapted to support user plane transactions over said mobile network between said control plane node and said IP network without need of user plane bearer in said mobile network, said control plane node interfacing, with or without IP tunnelling, with a gateway function interfacing with said IP network.

In an embodiment, said architecture comprises:

said control plane node adapted to select a gateway function and to establish an IP tunnel with said gateway function.

In an embodiment, said architecture comprises:

said gateway function adapted to provide Radius/Diameter accounting function and/or DHCP function for said control plane node.

In an embodiment, said architecture comprises:

said gateway function implemented in said control plane node, or in a mobile network node interfacing with said IP network.

In an embodiment, said architecture comprises:

said UE and said control plane node adapted for transparently carrying user plane IP packets encapsulated in control plane messages sent over control plane bearer between said UE and said control plane node.

Other embodiments, including other embodiments described above, are of course possible.

In another aspect, there is provided a method for access by an UE to user plane transactions services over a mobile network without need of user plane bearer in said mobile network, such as in particular in such architecture.

Various embodiments are provided, which may be taken alone or in combination, according to various combinations.

In an embodiment, said method comprises at least one step, based on an indication to said control plane node, that no user plane bearer is needed for said UE for said services.

In an embodiment, said indication is provided to said control plane node by at least one of:

said UE, providing said indication in a request for access to said user plane transactions services, a mobile network subscriber database, providing said indication in response to a request received from said control plane node.

In an embodiment, said method comprises a step of:

upon receiving said indication from said UE, said control plane node verifying that said UE has permission to use said services.

In an embodiment, said method comprises a step of:

upon verifying that said UE has permission to use said services, said control plane node supporting user plane transactions without need of user plane bearer for said UE for said services.

In an embodiment, said method comprises a step of:

upon verifying that said UE has permission to use said services, said control plane node getting IP address information from said gateway function and answering to an UE's request for access to said services with an acknowledgement including IP address information to be used by said UE for said services.

In an embodiment, said method comprises a step of:

said control plane node storing a mapping between UE identifier information and IP address information for said UE for said services.

In an embodiment, said method comprises a step of:

said gateway function associating IP address information for said UE with a control plane node serving said UE.

In an embodiment, said method comprises a step of:

said gateway function notifying the service environment with the IP address information that has been allocated to the UE Other embodiments, including other embodiments described above, are of course possible.

In another aspect, there is provided a method for IP address allocation to an UE for user plane transactions services over a mobile network without need of user plane bearer in said mobile network, such as in particular in such architecture.

Various embodiments are provided, which may be taken alone or in combination, according to various combinations.

In an embodiment, said method comprises said control plane node requesting IP address information for the UE via usage of address allocation server protocol (such as DHCP or any other protocol) to said gateway function.

In an embodiment, said method comprises a step of:

Indicating the UE identity and the target APN in the address allocation server protocol (such as DHCP or any other protocol) signalling sent from said control plane node to said gateway function.

In an embodiment, said method comprises a step of:

Indicating a node restart counter in the signalling exchange between said control plane node and said gateway function, releasing the resources associated with the other node when the restart counter of this other node has changed.

In an embodiment, said method comprises a step of:

said UE getting a new IP address from a new control plane node serving said UE in case of inter-control plane node mobility.

Other embodiments, including other embodiments described above, are of course possible.

In another aspect, there is provided a method for support of user plane transactions over a mobile network without need of user plane bearer in said mobile network, such as in particular in such architecture.

Various embodiments are provided, which may be taken alone or in combination, according to various combinations.

In an embodiment, said method comprises at least one step based on support of user plane transactions without need of user plane bearer.

In an embodiment, said method comprises a step of, for transport of user plane IP packets in uplink:

said UE encapsulating said IP packets in control plane messages sent over control plane bearer by said UE to said control plane node, respectively said control plane node de-encapsulating said IP packets.

In an embodiment, said method comprises a step of, for transport of user plane IP packets in uplink:

said UE using a specific message type indicating that user plane traffic is transported over control plane.

In an embodiment, said method comprises a step of, for transport of user plane IP packets in uplink:

said control pane node using said specific message type to provide different QoS to different types of traffic.

In an embodiment, said method comprises a step of, for transport of user plane IP packets in uplink:

said control plane node forwarding said IP packets towards said gateway function, with or without IP tunnelling.

In an embodiment, said method comprises a step of, for transport of user plane IP packets in uplink:

a relay function in said control plane node providing a mapping from UE to gateway function for said UE with or without IP tunnelling.

In an embodiment, said method comprises a step of, for transport of user plane IP packets in uplink:

if said UE was in idle mode when needing to send said IP packets, said UE first sending a service request to said control plane node, containing an indication that no user plane bearer needs to be established for said transaction.

In an embodiment, said method comprises a step of, for transport of user plane IP packets in uplink:

upon receiving said service request, said control plane node not initiating establishment of user plane bearer for said UE.

In an embodiment, said method comprises a step of, for transport of user plane IP packets in downlink:

said control plane node determining a target UE for said IP packets, based on a destination IP address of said IP packets, corresponding to on an IP address allocated to said UE.

In an embodiment, said method comprises a step of, for transport of user plane IP packets in downlink:

said control plane node encapsulating said IP packets in control plane messages sent over control plane bearer by said control plane node to said UE, respectively said UE de-encapsulating said IP packets.

In an embodiment, said method comprises a step of:

said control plane node using a specific message type indicating that user plane traffic is transported over control plane.

In an embodiment, said method comprises a step of, for transport of user plane IP packets in downlink:

said control pane node using said specific message type to provide different QoS to different types of traffic.

In an embodiment, said method comprises a step of, for transport of user plane IP packets in downlink:

said gateway function forwarding said IP packets towards said control plane node based on the destination IP address of said IP packets, corresponding to an IP address allocated to said UE and associated to the control plane node serving said UE; In an embodiment, said method comprises a step of:

a relay function in said control plane node providing a mapping from UE's IP address to UE's control plane bearer.

Other embodiments, including other embodiments described above, are of course possible.

In another aspect, there is provided a method for inter-control plane node mobility over a mobile network without need of user plane bearer in said mobile network, such as in particular in such architecture.

Various embodiments are provided, which may be taken alone or in combination, according to various combinations.

In an embodiment, said method comprises at least one step, based on de-activation and reactivation of a user plane service without need of user plane bearer during said inter-control plane node mobility.

Other embodiments, including other embodiments described above, are of course possible.

In another aspect, there is provided a method for selection of a serving control plane node supporting user plane transactions services without need of user plane bearer for an User Equipment UE in a mobile network, such as in particular in such architecture.

Various embodiments are provided, which may be taken alone or in combination, according to various combinations.

In an embodiment, said method comprises at least one step, based on said UE providing an indication during attachment to said mobile network, that said UE supports said services and/or may use said services after attachment to said mobile network.

Other embodiments, including other embodiments described above, are of course possible.

In another aspect, there are provided entities for such architecture and/or comprising means for performing such method(s), said entities including, in particular (but not exclusively): User Equipment UE, control plane node, gateway function.

Said control plane node may for example correspond to one of following mobile network nodes:

Mobility Management Entity MME for Evolved Packet System EPS,

Serving GPRS Support Node SGSN for GPRS/UMTS,

HSGW for CDMA/EVDO,

Access Service Network Gateway ASNGW for WiMAX.

The detailed implementation of such entities does not raise any special problem for a person skilled in the art, and therefore does not need to be more fully disclosed than has been made above, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus, comprising:

at least one processor; and at least one memory storing instructions which, when executed by the at least one processor, cause the apparatus at least to:

determine that user plane data is to be transmitted; and encapsulate the user plane data in a non access stratum signaling message based on the determination that user plane data is to be transmitted, and further based on an active signaling bearer between the apparatus and a mobility management entity, said non access stratum signaling message having, in a non access stratum signaling protocol, a message type indicating a transmission of the user plane data over a control plane.

2. The apparatus according to claim 1, wherein the instructions, when executed by the at least one processor, cause the apparatus at least to:

determine that the apparatus is in an idle mode when the user plane data is to be transmitted, and first initiate a service request procedure comprising sending a service request message, based on the determination that the apparatus is in the idle mode when the user plane data is to be transmitted, wherein said service request message comprises an indication that no user plane bearer is to be established.

3. The apparatus according to claim 1, wherein the instructions, when executed by the at least one processor, cause the apparatus at least to:

prioritize regular non access stratum signaling over non access stratum signaling used for said transmission of the user plane data over the control plane.

4. The apparatus according to claim 1, wherein the instructions, when executed by the at least one processor, cause the apparatus at least to:

include, in an attachment message, an indication of said transmission of the user plane data over the control plane.

5. The apparatus according to claim 1, wherein instructions, when executed by the at least one processor, cause the apparatus at least to:

during an attachment procedure, provide an access point name indicating that no packet data network connection to a packet data network gateway is to be established.

6. A method, comprising:

determining that user plane data is to be transmitted; and encapsulating the user plane data in a non access stratum signaling message based on the determination that user plane data is to be transmitted, and further based on an active signaling bearer between a user equipment and a mobility management entity, said non access stratum signaling message having, in a non access stratum signaling protocol, a message type indicating a transmission of the user plane data over a control plane.

7. The method according to claim 6, further comprising:

determining the user equipment is in an idle mode when the user plane data is to be transmitted; and first initiating a service request procedure comprising sending a service request message, based on the determination that the user equipment is in the idle mode when the user plane data is to be transmitted, wherein said service request message comprises an indication that no user plane bearer is to be established.

8. The method according to claim 6, further comprising:

prioritizing regular non access stratum signaling over non access stratum signaling used for said transmission of the user plane data over the control plane.

9. The method according to claim 6, further comprising:

including, in an attachment message, an indication of said transmission of the user plane data over the control plane.

10. The method according to claim 6, further comprising:

during an attachment procedure, providing an access point name indicating that no packet data network connection to a packet data network gateway is to be established.

* * * * *